US012429205B2

(12) United States Patent
Van Bommel et al.

(10) Patent No.: US 12,429,205 B2
(45) Date of Patent: Sep. 30, 2025

(54) LED FILAMENT ARRANGEMENT

(71) Applicant: SIGNIFY HOLDING B.V., Eindhoven (NL)

(72) Inventors: Ties Van Bommel, Horst (NL); Rifat Ata Mustafa Hikmet, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 18/270,251

(22) PCT Filed: Dec. 16, 2021

(86) PCT No.: PCT/EP2021/086257
§ 371 (c)(1),
(2) Date: Jun. 29, 2023

(87) PCT Pub. No.: WO2022/148632
PCT Pub. Date: Jul. 14, 2022

(65) Prior Publication Data

US 2024/0060633 A1 Feb. 22, 2024

(30) Foreign Application Priority Data

Jan. 5, 2021 (EP) .................................... 21150146

(51) Int. Cl.
*F21V 29/503* (2015.01)
*F21K 9/232* (2016.01)
(Continued)

(52) U.S. Cl.
CPC ............ *F21V 29/503* (2015.01); *F21V 29/70* (2015.01); *F21K 9/232* (2016.08); *F21K 9/60* (2016.08);
(Continued)

(58) Field of Classification Search
CPC ...... F21V 29/503; F21V 29/70; F21V 29/508; F21V 29/71; F21V 29/713; F21V 29/717;
(Continued)

(56) References Cited

U.S. PATENT DOCUMENTS 6,371,637 B1 * 4/2002 Atchinson ............. F21V 19/005 362/555
10,845,013 B2 * 11/2020 Tolen .................... F21V 23/006
(Continued)

FOREIGN PATENT DOCUMENTS

CN 205350910 U 6/2016
EP 2778503 A2 9/2014
(Continued)

*Primary Examiner* — Colin J Cattanach

(57) ABSTRACT

A light emitting diode, LED, filament arrangement (100, 400, 510), comprising an elongated LED filament (150) comprising an array of a plurality of light emitting diodes (110, 410), LEDs, and a carrier (240) arranged to support the plurality of LEDs. The LED filament arrangement further comprises a heat sink (250), wherein the LED filament is arranged upon the heat sink. The LED filament comprises a center axis, A, and elongates in a meandering shape in a first plane, P, wherein at least one of the LED filament and the heat sink is convex-shaped with respect to the center axis, A, along at least a first segment (120, 320) of the LED filament, and at least one of the LED filament and the heat sink is concave-shaped with respect to the center axis, A, along at least a second segment (130, 330) of the LED filament.

12 Claims, 6 Drawing Sheets

(51) Int. Cl.

| | |
|---|---|
| ***F21K 9/60*** | (2016.01) |
| ***F21K 9/64*** | (2016.01) |
| ***F21K 9/66*** | (2016.01) |
| ***F21K 9/69*** | (2016.01) |
| ***F21V 29/70*** | (2015.01) |
| ***F21Y 103/10*** | (2016.01) |
| ***F21Y 115/10*** | (2016.01) |

(52) U.S. Cl.
CPC ...................................... *F21K 9/64* (2016.08); *F21K 9/66* (2016.08); *F21K 9/69* (2016.08); *F21Y 2103/10* (2016.08); *F21Y 2115/10* (2016.08)

(58) Field of Classification Search
CPC ........ F21V 29/73; F21V 29/74; F21V 29/745; F21V 29/75; F21V 29/76; F21V 29/763; F21V 29/767; F21V 29/77; F21V 29/773; F21V 29/777; F21V 29/78; F21V 29/80; F21V 29/81; F21Y 2103/10; F21Y 2115/10; F21K 9/23; F21K 9/232; F21K 9/233; F21K 9/235; F21K 9/237; F21K 9/238; F21K 9/27; F21K 9/282; F21K 9/285; F21K 9/287; F21K 9/60; F21K 9/61; F21K 9/62; F21K 9/64; F21K 9/65; F21K 9/66; F21K 9/68; F21K 9/69; F21K 9/90
See application file for complete search history.

(56) References Cited

U.S. PATENT DOCUMENTS

| | | | | |
|---|---|---|---|---|
| 2011/0050073 | A1* | 3/2011 | Huang .................... | F21V 29/70 313/317 |
| 2015/0049475 | A1 | 2/2015 | Pan et al. | |
| 2016/0178133 | A1 | 6/2016 | Kong et al. | |
| 2016/0238199 | A1* | 8/2016 | Yeung ........................ | F21K 9/90 |
| 2017/0138543 | A1* | 5/2017 | Steele ........................ | F21V 9/38 |
| 2018/0112831 | A1 | 4/2018 | Huang | |
| 2018/0119892 | A1* | 5/2018 | Jiang ...................... | H05B 45/00 |
| 2020/0154608 | A1* | 5/2020 | Kim ..................... | C09D 163/00 |
| 2022/0120426 | A1 | 4/2022 | Hikmet et al. | |
| 2022/0228715 | A1 | 7/2022 | Van Bommel et al. | |
| 2022/0403987 | A1 | 12/2022 | Van Bommel et al. | |
| 2023/0020560 | A1* | 1/2023 | Bukkems ................ | F21V 3/062 |

FOREIGN PATENT DOCUMENTS

| | | | | | |
|---|---|---|---|---|---|
| JP | 2014179319 | A | * | 9/2014 | ............. F21K 9/232 |
| JP | 2015056667 | A | | 3/2015 | |
| JP | 2019029357 | A | | 2/2019 | |
| JP | 2019194950 | A | * | 11/2019 | |
| WO | 2018001781 | A1 | | 1/2018 | |
| WO | 2020088966 | A1 | | 5/2020 | |

* cited by examiner

LED FILAMENT ARRANGEMENT

CROSS-REFERENCE TO PRIOR APPLICATIONS

This application is the U.S. National Phase application under 35 U.S.C. § 371 of International Application No. PCT/EP2021/086257, filed on Dec. 16, 2021, which claims the benefit of European Patent Application No. 21150146.5, filed on Jan. 5, 2021. These applications are hereby incorporated by reference herein.

FIELD OF THE INVENTION

The present invention generally relates to lighting arrangements comprising one or more light emitting diodes, LEDs. More specifically, the lighting arrangement is related to a light emitting diode, LED, filament arrangement. The present invention is further related to a lighting device comprising the LED filament arrangement.

BACKGROUND OF THE INVENTION

The use of light emitting diodes, LEDs, for illumination purposes continues to attract attention. Compared to incandescent lamps, fluorescent lamps, neon tube lamps, etc., LEDs provide numerous advantages such as a longer operational life, a reduced power consumption, and an increased efficiency related to the ratio between light energy and heat energy.

There is currently a very large interest in lighting devices and/or arrangements (such as lamps) provided with LEDs, and incandescent lamps are rapidly being replaced by LED-based lighting solutions. It is nevertheless appreciated and desired to have retrofit lighting devices (e.g. lamps) which have the look of an incandescent bulb. For this purpose, it is possible to make use of the infrastructure for producing incandescent lamps based on LED filaments arranged in such a bulb. It will be appreciated that LED filament lamps of this kind are highly appreciated as they are very decorative.

However, it is of interest to improve one or more properties of the LED filaments. In particular, there is a wish to improve the appearance of the LED filaments, to reduce the production cost of the LED filaments and/or to provide a facilitated assembly of the LED filaments.

Hence, it is an object of the present invention to improve one or more properties of the LED filaments, and in particular to augment the aesthetical appearance and/or the decorative aspect of the LED filaments and/or the LED filament lamps.

SUMMARY OF THE INVENTION

Hence, it is of interest to explore the possibility of combining one or more of the numerous advantages of LED filament arrangements comprising LEDs, whilst improving the appearance and/or the decorative aspect of the LED filaments and/or the LED filament lamps.

This and other objects are achieved by providing a LED filament arrangement having the features in the independent claim. Preferred embodiments are defined in the dependent claims.

Hence, according to the present invention, there is provided a light emitting diode, LED, filament arrangement, comprising an elongated LED filament comprising an array of a plurality of light emitting diodes, LEDs, and a carrier arranged to support the plurality of LEDs. The LED filament arrangement further comprises a heat sink, wherein the LED filament is arranged upon the heat sink. The LED filament comprises a center axis, A, and elongates in a meandering shape in a first plane, P, wherein at least one of the LED filament and the heat sink is convex-shaped with respect to the center axis, A, along at least a first segment of the LED filament, and at least one of the LED filament and the heat sink is concave-shaped with respect to the center axis, A, along at least a second segment of the LED filament.

Thus, the present invention is based on the idea of providing a flat meandering shaped LED filament arrangement which, for an observer, may be analogous in appearance to a spiral-shaped or coil-shaped LED filament. Hence, the purpose of the features of the LED filament arrangement of the present invention is to mimic the appearance of a LED filament having a spiral or coil shape. This effect is obtained by the convex-shaped first segment(s) and the concave-shaped second segment(s) of the LED filament, creating "mountains" and "valleys", respectively, along the LED filament, rendering the impression to an observer of a spiral-shaped or coil-shaped LED filament. Hence, the convex shape of the components of the first segment(s) and the concave shape of the components of the second segment(s) provides an illusion of depth or perspective to the meandering-shaped LED filament arrangement therefore enabling an aesthetic appearance closely resembling a spiral-shaped LED filament. The relatively flat LED filament arrangement may hereby save space, e.g. if provided in lighting devices such as luminaires or the like, without compromising the lighting properties. Furthermore, by the above-mentioned features of the LED filament arrangement, the LED filament arrangement, as well as the light emitted therefrom during operation, becomes aesthetically attractive.

The present invention is further advantageous in that the numerous advantages of using LED technology may be combined with the attractiveness and the appealing properties of the LED filament arrangement as disclosed.

The present invention is further advantageous in that the meandering shape of the LED filament contributes to the aesthetic attractiveness of the LED filament arrangement and/or the light emitted from the LED filament arrangement.

The present invention is further advantageous in that the LED filament arrangement comprises relatively few components. The low number of components is advantageous in that the LED filament arrangement is relatively inexpensive to fabricate. Moreover, the low number of components of the LED filament arrangement implies an easier recycling, especially compared to devices or arrangements comprising a relatively high number of components which impede an easy disassembling and/or recycling operation.

The present invention is further advantageous in that the heat sink may efficiently dissipate heat from the LEDs during operation of the LED filament arrangement, thereby minimizing the risk of malfunction of the LED filament due to overheating of the LEDs.

The present invention is further advantageous in that it provides a high brightness spiral look LED filament arrangement. Moreover, the structure of the LED filament arrangement of the present invention enables the optimization of the assembly process of LED filament arrangements for lighting applications and provides a variability of lighting effects, ultimately reducing the cost for producing such LED filament arrangements and improving its aesthetic appearance. An object of the present invention further resides in the use of the LED filament arrangement for luminaire applications which requires the use of filament arrangements of minimal depth, i.e. as flat as possible, without compromising the lighting properties.

The LED filament arrangement of the present invention comprises an array of a plurality of LEDs. By the term “array”, it is here meant a linear arrangement or chain of LEDs, or the like, arranged on the LED filament arrangement. The LED filament further comprises a carrier arranged to support the plurality of LEDs. Hence, the plurality of LEDs may be arranged, mounted and/or mechanically coupled on/to a carrier or substrate of the LED filament which embodies a meandering shape. The carrier of the LED filament arrangement is further mounted on the heat sink. For example, the heat sink may be a solid heat sink or a deep drawn heat sink. By the term “heat sink” it is here meant a heat exchanger arranged to conduct or transport heat generated by the LEDs away from the carrier supporting them in order to improve the thermal dissipation of the components.

The LED filament arrangement comprises at least one first segment and at least one second segment of the LED filament. Hence, the first and second segments constitute integral sections of the LED filament, which elongate along the center axis, A, in a meandering shape enabling said LED filament to be comprised in the first plane, P. By “meandering shape”, it is here meant that the shape of the LED filament or the direction of unfoldment of the LED filament proceeds in a convoluted fashion. In other words, a meandering-shaped LED filament is a LED filament which pattern follows a sinusoidal shape or a zigzag shape. Furthermore, by the term “shape” it is here meant the physical property of the LED filament such as e.g. the size, form and/or configuration of the LED filament. By the term “plane”, it is here meant a flat surface. In other words, the LED filament embodies a sinusoidal pattern along the center axis, A, with substantially no deviation in a dimension perpendicular to the first plane, P. Therefore, the meandering shape of the LED filament encompasses only two dimensions, i.e. the ones forming the plane, P, which renders the LED filament very compact and thin. Additionally, the first segment(s) and second segment(s) represent formative sections of the LED filament for which the heat sink and/or LED filament embodies a convex configuration and a concave configuration respectively. It will be appreciated that the convex and concave shape of the heat sink and/or the LED filament may also be formed by the carrier of the LED filament.

According to an embodiment of the present invention, a cross-section of the at least one first segment of the LED filament perpendicular to the center axis, A, may be semi-circular-shaped with a first radius, $R_1$, and a cross-section of the at least one second segment of the LED filament perpendicular to the center axis, A, may be semi-circular-shaped with a second radius, $R_2$. The semi-circular shape of the cross-section of the at least one first segment and the at least one second segment defines the convex and concave shapes of the heat sink and/or LED filament forming said at least one first segment and at least one second segment. In other words, the convex shape of the at least one first segment (e.g. including the heat sink) is semi-circular with a radius of curvature, $R_1$, and the concave shape of the at least one second segment (e.g. including the heat sink) is semi-circular with a radius of curvature, $R_2$. It will be appreciated that the radius, $R_1$, of the semi-circular shape cross-section of the at least one first segment may be equal to the radius, $R_2$, of the of the semi-circular shape cross-section of the at least one second segment. The present embodiment is advantageous in that the semi-circular shape of the cross-section of the first and second segment(s) further improves the resemblance of the LED filament arrangement to a spiral-shaped or coil shaped LED filament.

According to an embodiment of the present invention, the LED filament may form at least one loop. By the term “loop” it is here meant a shape produced by the LED filament which bends around in the first plane, P, such that the end of the elongation of the LED filament arrangement meets the beginning of the elongation of the LED filament arrangement. In other words, the present embodiment is based on the provision of the meandering-shaped LED filament forming a substantially circular pattern in the first plane, P. The present embodiment is advantageous in that it improves the aesthetic appearance of the LED filament arrangement when used in light sources. It will further be appreciated that the LED filament may form more than one loop According to an embodiment of the present invention, the heat sink, in accordance with the LED filament, may elongate in the meandering shape in the first plane, P. The present embodiment is consequent with the composition or structure of the LED filament arrangement for which the carrier and the LED filament supported thereon are mounted on the heat sink of the respective first segment(s) and second segment(s) resulting in the heat sink taking the same meandering shape as the rest of the components of the LED filament arrangement. The present embodiment is further advantageous in that it permits the heat sink to be completely hidden under the LED filament, therefore not visible by an observer looking directly at the LED filament arrangement from a specific angle. This may result in an even greater aesthetic appearance of the LED filament arrangement.

According to an embodiment of the present invention, a single first segment of the LED filament may be followed by a single second segment of the LED filament along the center axis, A, in an alternating manner. In other words, a concave-shaped portion of the heat sink and/or LED filament is followed by a convex-shaped portion of the heat sink and/or LED filament in an alternating manner. The present embodiment is advantageous in that it enables a symmetric alternation of the shape of the LED filament. It will be appreciated that the number of convex/concave alternations of the LED filament may preferably be 4 alternations, more preferably 6 alternations and most preferably 8 alternations. The present embodiment is further advantageous in that such alternation enables a greater distribution of the light of the different segments of the LED filament thus avoiding concentration of similar light characteristics or properties at specific positions along the elongation of the LED filament. The alternating manner with which the first segment(s) and second segment(s) follow one another further provides the possibility of a wider range of lighting effects achievable by the LED filament increasing its resemblance to a spiral or coil-shaped LED filament. The present embodiment is further advantageous in that it provides an illusion of depth or perspective to the LED filament arrangement therefore enabling an aesthetic appearance closely resembling a spiral-shaped LED filament.

According to an embodiment of the present invention, the at least one first segment and the at least one second segment may constitute linear portions of the LED filament which are connected by at least one curved portion of the LED filament. It will be appreciated that the linear portions forming the first segment(s) and second segment(s) may be substantially linear or straight. Furthermore, the curved portions connecting a first segment to a subsequent second segment may comprise a relatively short radius of curvature such that the curved portions may provide the appearance of rather sharp corners giving the sinusoidal shape or meandering shape to the LED filament. The present embodiment is advantageous in that the substantially linear portions improve the light distribution of the LEDs comprised thereon. Moreover, the curved portions provide a transition portion between the differently characterized first segment(s) and second segment(s) of the LED filament. Additionally, the aesthetical appearance of the LED filament arrangement is increased.

According to an embodiment of the present invention, the linear portions may have a length, L, wherein 20 mm$<$L$<$200 mm, and wherein the LED filament may have a width, W, wherein 1 mm$<$W$<$5 mm. According to another embodiment of the present invention, a distance, H, between the single first segment and the single second segment along a first axis, D, in the first plane, P, and in a direction of a propagation of the meandering shape of the LED filament, may fulfill $2W<H<10W$. The present embodiment is advantageous in that it enables sufficient distancing between successive first segment(s) and second segment(s) such that the meandering shape of the LED filament is distinctive when the LEDs are in operation. The present embodiment results in a greater aesthetic appearance.

According to an embodiment of the present invention, the first radius, $R_1$, of the semi-circular shaped cross-section of the at least one first segment may fulfil $R_1>0.1L$ and the second radius, $R_2$, of the semi-circular shaped cross-section of the at least one second segment may fulfil $R_2>0.1L$. The present embodiment is advantageous in that it enables the heat sink to comprise a thickness capable of sufficiently dissipating the heat generated by the LED filament when operating. According to another embodiment of the present invention, the first radius, $R_1$, may preferably fulfil $0.7L>R_1>0.3L$ and the second radius, $R_2$, may preferably fulfill $0.7L>R_2>0.3L$. For example, in case $R_1=R_2=0.5L$, the shape of the LED filament may be sinusoidal along its length.

According to an embodiment of the present invention, the carrier and the heat sink may comprise a width equal to the width, W, of the LED filament. The present embodiment is advantageous in that it enables the heat sink to appear substantially hidden behind the carrier and therefore not visible to an observer looking directly at the LED filament arrangement.

According to an embodiment of the present invention, the LED filament may comprise an encapsulant at least partially enclosing the plurality of LEDs. By the term “encapsulant”, it is here meant a material, element, arrangement, or the like, which is configured or arranged to at least partially surround, encapsulate and/or enclose the plurality of LEDs of the LED filament(s). Furthermore, the encapsulant may comprise at least one of a luminescent material configured to at least partly convert light emitted from the plurality of LEDs and a light scattering material configured to scatter light emitted from the plurality of LEDs. The present embodiment is advantageous in that the LED filament may provide a desired light distribution and/or a decorative effect. By the term “luminescent material”, it is here meant a material, composition and/or substance which is configured to emit light under external energy excitation. For example, the luminescent material may comprise a fluorescent material. The luminescent material is configured to convert at least a portion or part of the light emitted from the plurality of LEDs into converted light.

According to an embodiment of the present invention, there is provided a lighting device. The lighting device may comprise a LED filament arrangement according to any one of the preceding embodiments, and a cover comprising an at least partially light-transmissive material, wherein the cover at least partially encloses the LED filament arrangement. The lighting device may further comprise an electrical connection connected to the LED filament arrangement for a supply of power to the plurality of LEDs of the LED filament arrangement. For example, the electrical connection may be done through a mechanical connection used for holding the LED filament in place in the lighting device. It will be appreciated that the lighting device may be a lamp comprising a lamp cap or a luminaire comprising a power plug.

According to an embodiment of the present invention, the cover of the lighting device may constitute a light output window arranged in a second plane, S, parallel to the first plane, P. It will be appreciated that the meandering shape of the LED filament arrangement elongating along the center axis, A, faces the light output window given the parallel relation of the first plane, P, and the second plane, S. It will be appreciated that an observer may observe the LED filament in a direction (substantially) perpendicular to the first plane, P, in which the LED filament elongates, such that the LED filament thereby may appear as a coil-shaped or spiral-shaped LED filament to the observer. The present embodiment is further advantageous in that the light output window improves the distribution of the light emitted by the various portions of the LED filament arrangement facing it.

Further objectives of, features of, and advantages with, the present invention will become apparent when studying the following detailed disclosure, the drawings and the appended claims. Those skilled in the art will realize that different features of the present invention can be combined to create embodiments other than those described in the following.

BRIEF DESCRIPTION OF THE DRAWINGS

This and other aspects of the present invention will now be described in more detail, with reference to the appended drawings showing embodiment(s) of the invention.

DETAILED DESCRIPTION

Figure 1:
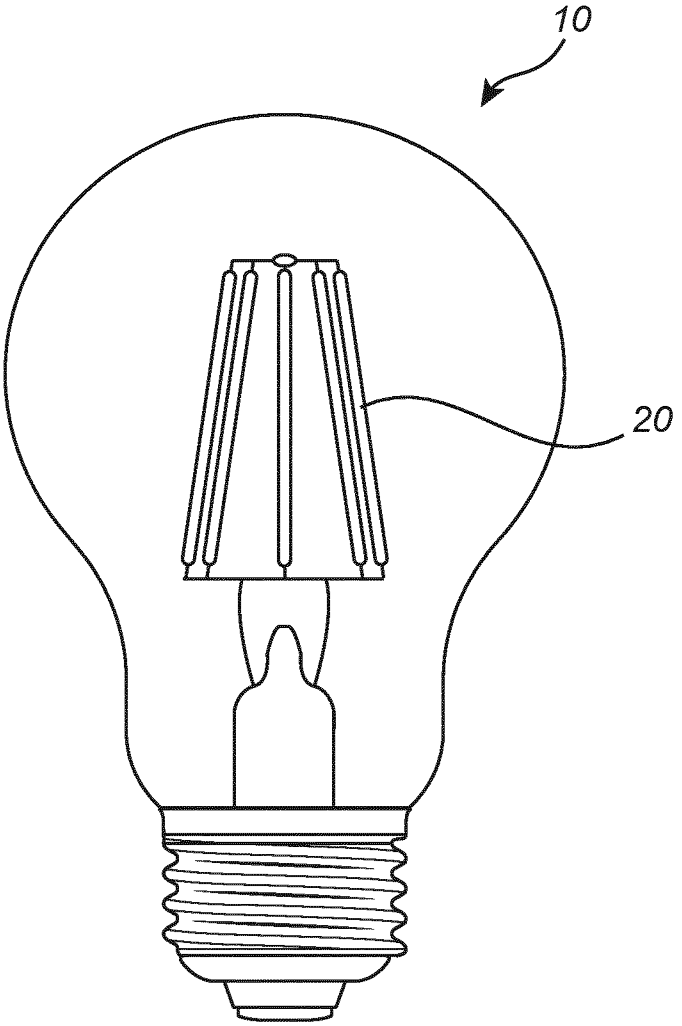
FIG. 1 shows a LED filament lamp according to the prior art.

FIG. 1 shows a LED filament lamp 10 according to the prior art, comprising a plurality of LED filaments 20. LED filament lamps 10 of this kind are highly appreciated as they are very decorative, as well as providing numerous advantages compared to incandescent lamps such as a longer operational life, a reduced power consumption, and an increased efficiency related to the ratio between light energy and heat energy. LED filament lamps 10 of this kind are able to produce warm white light. However, it is of interest to improve the properties of the light emitted from the LED filaments 20 without impairing the appearance and/or the decorative aspect of the LED filaments 20 and/or the LED filament lamps 10.

Figure 2A:
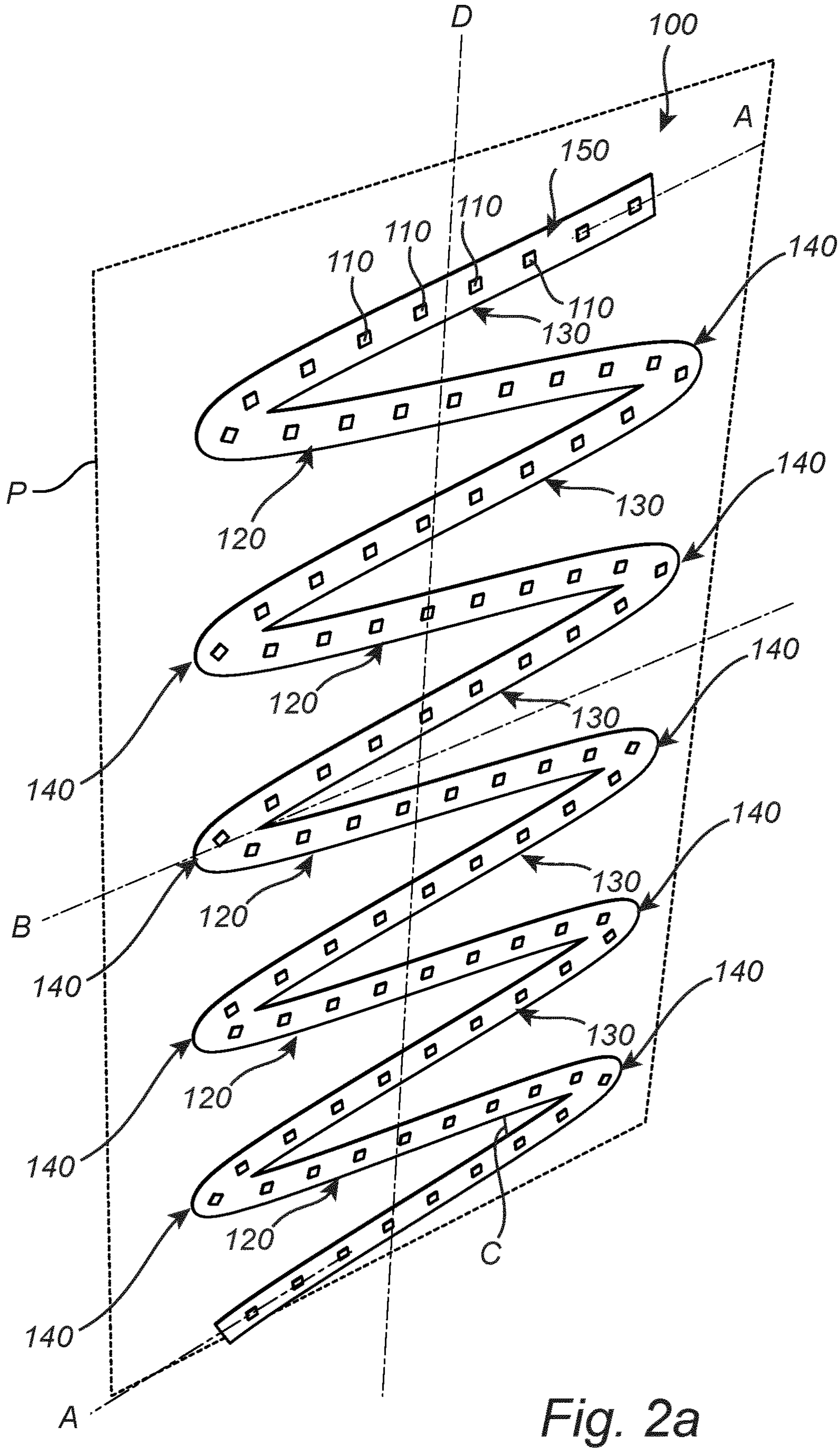
FIGS. 2*a*-2*b* show a LED filament arrangement according to an exemplifying embodiment of the present invention.

FIG. 2*a* illustrates a front view of a LED filament arrangement 100 according to an exemplifying embodiment of the present invention. The LED filament arrangement 100 is shown having a LED filament 150. The LED filament 150 is further depicted comprising a meandering shape or sinusoidal shape resembling a coil-shaped LED filament. The meandering-shaped LED filament 150 of FIG. 2*a* is shown elongating along a center axis, A, within a first plane, P, wherein the first plane, P, is a flat plane formed by a first axis, D, and a second axis, B, perpendicular to the first axis, D. The flat first plane, P, thus enables the LED filament arrangement 100 to be highly suitable for luminaire applications, which require flatter light sources, whilst still having the aesthetic appearance of a spiral or coil-shaped LED filament. FIG. 2*a* further illustrates an array of a plurality of LEDs 110 comprised on a sinusoidal-shaped LED filament 150. The array of a plurality of LEDs 110 is shown in FIG. 2*a* disposed along the meandering-shaped LED filament 150 and configured to emit light to create a lighting effect resembling a coil-shaped LED filament. The LED filament 150 is shown separated into first segments 120 followed by second segments 130 in an alternating manner along center axis, A. The first segments 120 and the second segments 130 are shown as substantially linear portions of the LED filament 150 transitioning between one another via curved portions 140. The number of first and second segments 120, 130 may be at least three. The curved portions 140 are shown in FIG. 2*a* having a relatively small radius of curvature, C, therefore forming rather sharp corners enabling repetitive transitions between the first segments 120 and the second segments 130. The curved portions or sharp corners 140 provided in FIG. 2*a* give the optical illusion of a depth or perspective to the flat LED filament 150, which mimics a spiral-shaped or coil-shaped LED filament. It is to be noted that the LED filament arrangement 100 of FIG. 2*a* may comprise an encapsulant arranged to at least partially enclose the LEDs 110, but is not shown in FIG. 2*a* in order to facilitate the illustration of the array of LEDs 110 of the LED filament 150. It also to be noted that the heat sink, upon which the LED filament 150 is arranged, is not visible in FIG. 2*a* as it may be positioned beneath the LED filament 150. Alternatively, the heat sink may be provided as a plate or the like, wherein the meandering LED filament 150 may arranged on the heat sink.

Figure 2B:
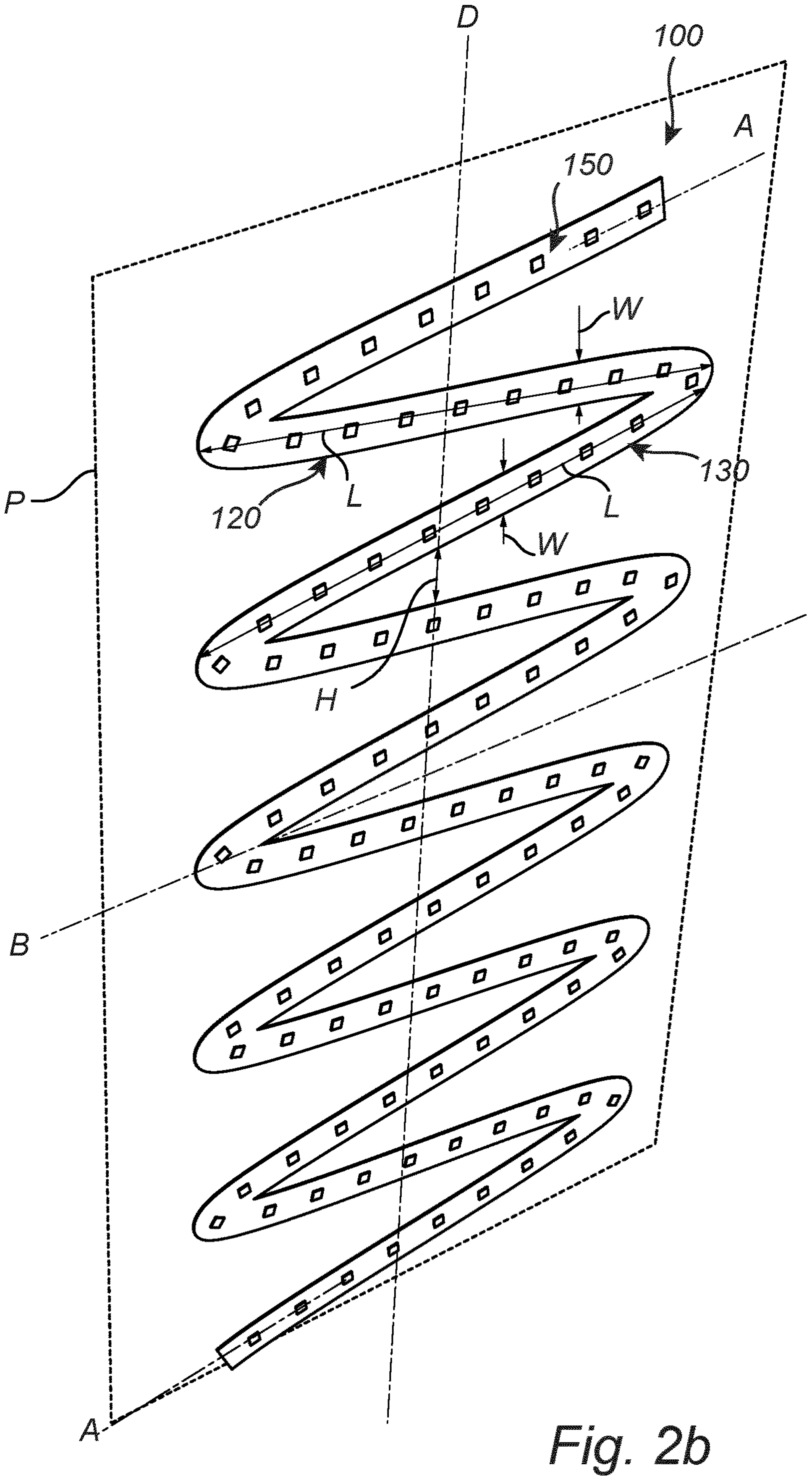

FIG. 2*b* illustrates a front view of the LED filament arrangement 100 and the LED filament 150 as shown in FIG. 2*a* according to an exemplifying embodiment of the present invention. FIG. 2*b* further shows the linear portion of the first segment 120 having a length, L, and the linear portion of the second segment 130 having the same length, L. The length, L, of the linear portions of the first and second segments 120, 130 is preferably greater than 20 mm but lower than 200 mm, more preferably greater than 50 mm but lower than 175 mm and most preferably greater than 100 mm but lower than 150 mm. FIG. 2*b* further illustrates the first segment 120 of the LED filament 150 having a width, W, and the second segment 130 of the LED filament 150 having the same width, W, wherein the width, W, is constant along the linear portion of the first segment 120 and along the linear portion of the second segment 130. The width, W, is preferably greater than 1 mm and lower than 5 mm. Moreover, FIG. 2*b* illustrates a distance, H, separating the first segment 120 from the second segment 130 along the elongation of the LED filament 150 along the first axis, D. In other words, the distance, H, along the first axis, D, represents the pitch or spacing between each first segments 120 and each second segments 130 directly following one another in the alternating formation of the meandering-shaped LED filament 150. Furthermore, the distance, H, depicted in FIG. 2*b* preferably fulfils $2W<H<10W$, more preferably fulfils $3W<H<7W$ and most preferably fulfils $4W<H<5W$.

Figure 3A:
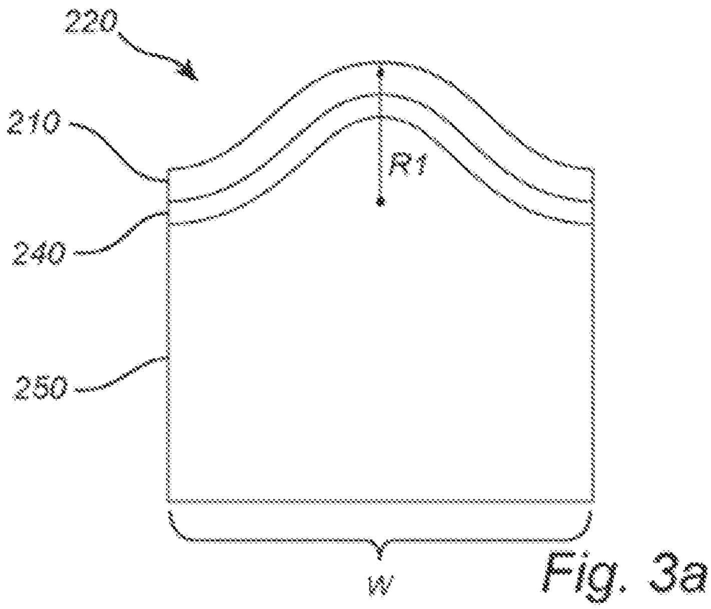
FIGS. 3*a*-3*b* show cross-sections of the first segment and second segment of the LED filament arrangement according to exemplifying embodiments of the present invention.

FIG. 3*a* illustrates a cross-section 220 of the first segment of the LED filament arrangement according to an exemplifying embodiment of the present invention. Moreover, the cross-section 220 shown in FIG. 3*a* represents a cross-section perpendicular to the center axis, A, shown in the previous figures. FIG. 3*a* depicts a heat sink 250 upon which a carrier 240 supporting the plurality of LEDs (not shown) is mounted such that the heat sink 250 dissipates the heat generated by the LED filament during operation. The cross-section 220 further illustrates the carrier 240, and consequently the LED filament and its plurality of LEDs, at least partially enclosed by an encapsulant 210. The encapsulant 210 comprises at least one of a light-scattering material and a luminescent material. It is to be noted that the encapsulant 210 acts as a filling material surrounding the LED filament. The cross-section 220 therefore illustrates the layered formation of the LED filament arrangement composed of the heat sink 250, the carrier 240 supporting the LEDs and the encapsulant 210. FIG. 3*a* further illustrates the convex shape of the heat sink 250, and in this case also the convex shape of the LED filament, the carrier 240 and the encapsulant 210, wherein said convex shape is depicted as a semi-circular shape of a first radius, $R_1$. The first radius, $R_1$, is shown in FIG. 3*a* representing the height of the semi-circular shaped cross-section 220 or the height of the "mountain" of the first segment. FIG. 3*a* therefore illustrates the convex shape of the LED filament along the length, L, of the first segment of the LED filament.

In the context of this application semi-circular is to be understood as literally semi-circular, at least partially semi-circular, having a more or less convex or concave shape as shown in FIG. 3*a*/3*b*, a 'mountain/'valley' shape, or any other similar shape for fulfilling the same effect.

Figure 3B:
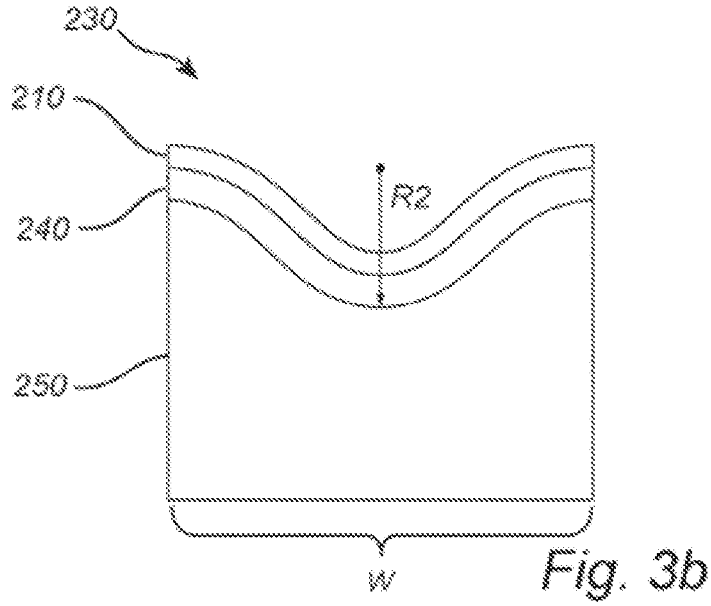

FIG. 3*b* illustrates a cross-section 230 of the second segment of the LED filament arrangement according to an exemplifying embodiment of the present invention. Similarly to FIG. 3*a*, FIG. 3*b* shows the cross-section 230 perpendicular to the center axis, A, of the previous figures and depicts the heat sink 250 upon which the carrier 240 supporting the LEDs f is mounted and at least partially enclosed by the encapsulant 210 thus forming a LED filament arrangement having a layered composition. FIG. 3*b* further illustrates the concave shape of the heat sink 250 along the second segment of the LED filament arrangement and in this case also the concave shape of the LED filament, the carrier 240 and the encapsulant 210, wherein said concave shape is depicted as a semi-circular shape of a second radius, $R_2$. The second radius, $R_2$, is shown in FIG. 3*b* representing the depth of the semi-circular shaped cross-section 230 or the depth of the "valley" of the second segment. FIG. 3*b* therefore illustrates the concave shape of the LED filament along the length, L, of the second segment of the LED filament. Additionally, it will be appreciated that the first radius, $R_1$, of the cross-section 220 of the first segment and the second radius, $R_2$, of the cross-section 230 of the second segment preferably fulfil $R_1>0.1L$ and $R_2>0.1L$, wherein L is shown as the length of the first segment and second segment similarly shown in FIG. 2*b*.

Figure 4:
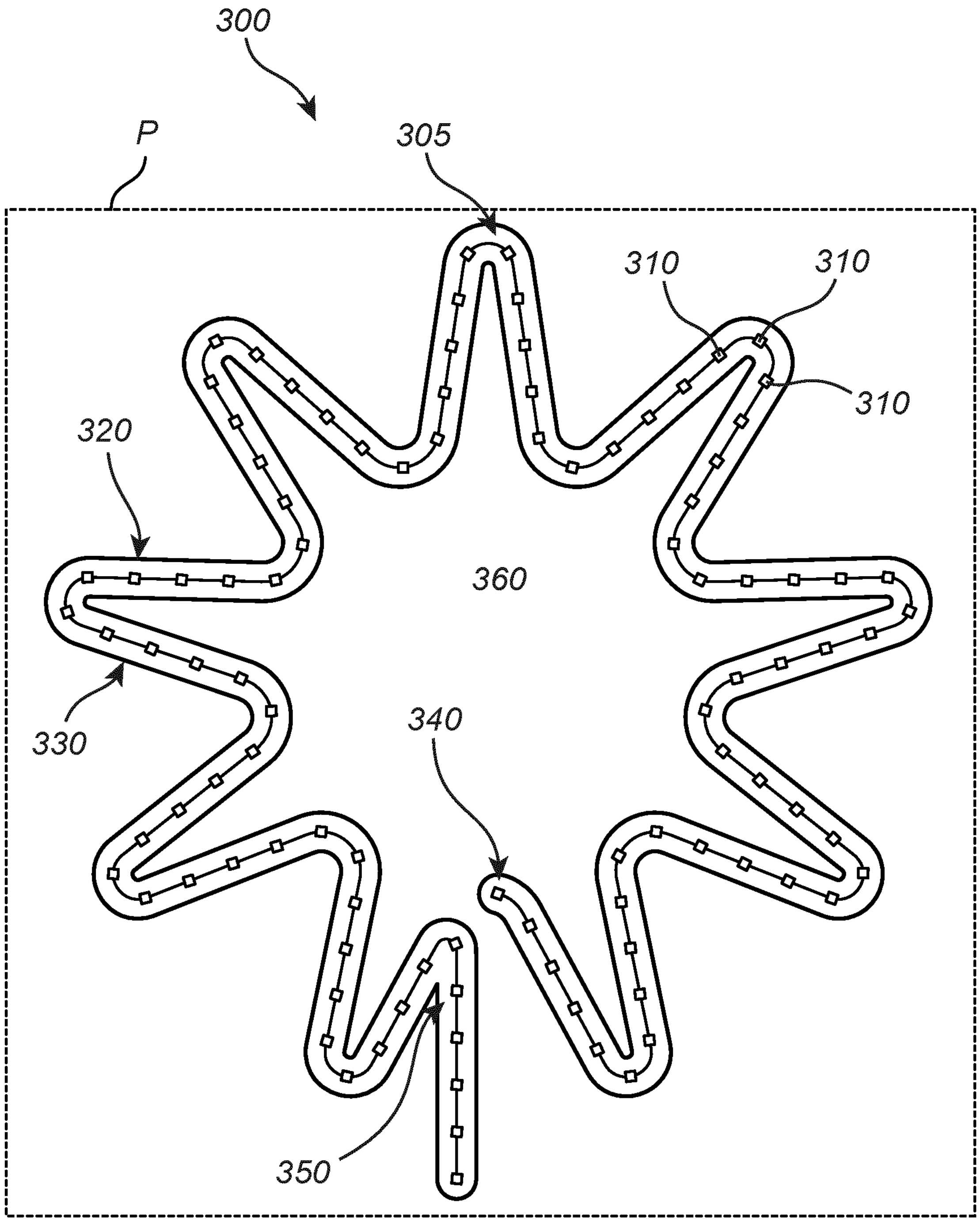
FIG. 4 shows a different configuration of the LED filament arrangement according to exemplifying embodiments of the present invention.

FIG. 4 illustrates a front view of a LED filament arrangement 300 comprising a LED filament 305 having a differently configured elongation than the LED filament arrangements shown in previous figures. FIG. 4 shows the LED filament 305 of the LED filament arrangement 300 forming a loop 360 such that the end 340 of its elongation meets the beginning 350 of its elongation in a circular or looping fashion whilst remaining in the first plane, P. The LED filament 305 may alternatively form at least 3 consecutive loops. The LED filament 305 is further shown in FIG. 4 comprising an array of a plurality of LEDs 310 and comprising alternating first segments 320 and second segments 330 forming a meandering shape along the looped elongation of the LED filament 305. It is to be noted that the LED filament arrangement 300 of FIG. 4 may comprise an encapsulant arranged to at least partially enclose the LED filament 305, but is not shown in order to facilitate the illustration of the array of a plurality of LEDs 310 of the LED filament 305. It also to be noted that a heat sink, upon which the LED filament 305 is arranged, is not visible in FIG. 4 as it is positioned beneath the LED filament 305. Alternatively, the heat sink may be provided as a plate or the like, wherein the meandering LED filament 150 may arranged on the heat sink.

Figure 5:
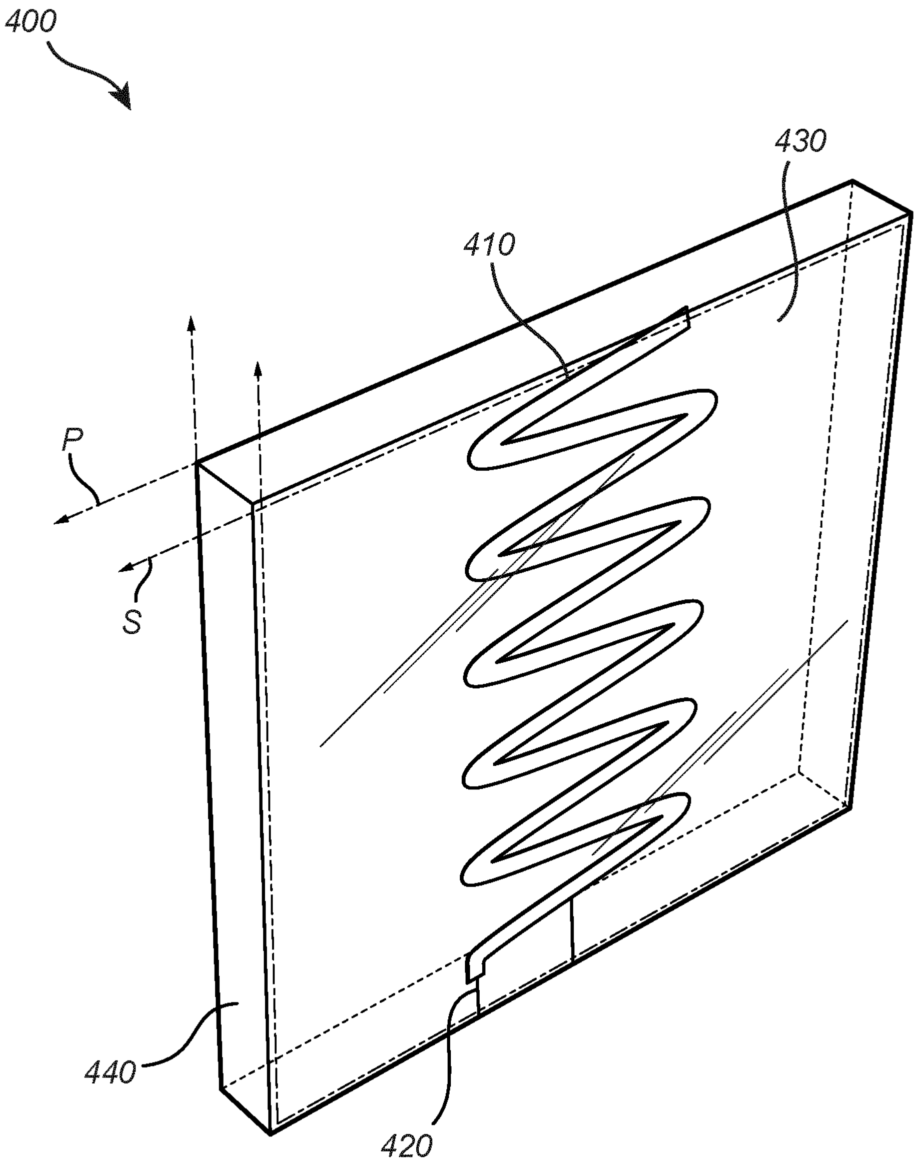
FIG. 5 shows a lighting device comprising a LED filament arrangement according to exemplifying embodiments of the present invention.

FIG. 5 illustrates a lighting device 400, e.g. a luminaire, comprising a LED filament arrangement 410 according to any embodiment of previous figure(s) and associated text(s). FIG. 5 further shows the LED filament arrangement 410 mounted in a frame 440 such that the LED filament of the LED filament arrangement 410 elongates in a meandering shape in the first plane, P. Moreover, the lighting device 400 is shown comprising an electrical connection 420 connected to the LED filament arrangement 410 for supplying power to the plurality of LEDs of the LED filament arrangement 410. The lighting device 400 of FIG. 5 further comprises a cover or light output window 430, formed of a material at least partially light transmissive, mounted on the frame 440 and over the LED filament of the LED filament arrangement 410 such that the light output window 430 diffuses the light emitted from the plurality of LEDs of the LED filament. FIG. 5 further depicts the light output window 430 comprised in the second plane, S, in turn shown parallel to the first plane, P, of the LED filament arrangement 410.

The person skilled in the art realizes that the present invention by no means is limited to the preferred embodiments described above. On the contrary, many modifications and variations are possible within the scope of the appended claims. For example, one or more of the LED filament arrangement 100, 300, 410, the first segment 120, 320 and/or the second segment 130, 230 of the LED filament arrangement 100, 300, 410, etc., may have different shapes, dimensions and/or sizes than those depicted/described.

The invention claimed is:

1. A light emitting diode, LED, filament arrangement, comprising an elongated LED filament comprising an array of a plurality of light emitting diodes, LEDs, and a carrier arranged to support the plurality of LEDs, a heat sink, the LED filament being arranged upon the heat sink, and the heat sink being configured to dissipate heat from the plurality of LEDs during operation, wherein the LED filament comprises a center axis, A, elongates in a meandering shape in a first plane, P, and forms at least one loop, wherein at least one of the LED filament and the heat sink is convex-shaped with a semi-circular cross section with respect to the center axis, A, along at least one first segment of the LED filament, at least one of the LED filament and the heat sink is concave-shaped with a semi-circular cross section with respect to the center axis, A, along at least one second segment of the LED filament, and wherein the at least one first segment and the at least one second segment constitute linear portions of the LED filament which are connected by at least one curved portion of the LED filament, and the heat sink has alternating convex and concave portions with semi-circular cross sections within each of the linear portions of the LED filaments in the at least one first segment and the at least one second segment.

2. The LED filament arrangement according to claim 1, wherein a cross-section of the at least one first segment of the LED filament perpendicular to the center axis, A, is semi-circular-shaped with a first radius, $R_1$, and a cross-section of the at least one second segment of the LED filament perpendicular to the center axis, A, is semi-circular-shaped with a second radius, $R_2$.

3. The LED filament arrangement according to claim 2, wherein the linear portions have a length, L, and $R_1>0.1L$ and $R_2>0.1L$.

4. The LED filament arrangement according to claim 3, wherein $0.7L>R_1>0.3L$ and $0.7L>R_2>0.3L$.

5. The LED filament arrangement according to claim 1, wherein a single first segment of the LED filament is followed by a single second segment of the LED filament along the center axis, A, in an alternating manner.

6. The LED filament arrangement according to claim 5, wherein the LED filament has a width, W, and a distance, H, between the single first segment and the single second segment along a first axis, D, in the first plane, P, and in a direction of a propagation of the meandering shape of the LED filament, fulfills $2W<H<10W$.

7. The LED filament arrangement according to claim 1, wherein the linear portions have a length, L, wherein 20 mm<L<200 mm, and wherein the LED filament has a width, W, wherein 1 mm<W<5 mm.

8. The LED filament arrangement according to claim 1, wherein the heat sink, in accordance with the LED filament, elongates in the meandering shape in the first plane, P.

9. The LED filament arrangement according to claim 1, wherein the carrier and the heat sink comprise a width substantially equal to a width, W, of the LED filament.

10. The LED filament arrangement according to claim 1, wherein the LED filament comprises an encapsulant at least partially enclosing the plurality of LEDs, wherein the encapsulant comprises at least one of a light-scattering material and a luminescent material.

11. A lighting device, comprising a LED filament arrangement according to claim 1, a cover comprising an at least partially light-transmissive material, wherein the cover at least partially encloses the LED filament arrangement, and an electrical connection connected to the LED filament arrangement for a supply of power to the plurality of LEDs of the LED filament arrangement.

12. The lighting device according to claim 11, wherein the cover constitutes a light output window arranged in a second plane, S, parallel to the first plane, P.

* * * * *